United States Patent [19]
Bulthuis

[11] 3,991,275
[45] Nov. 9, 1976

[54] APPARATUS FOR OPTICALLY READING A RADIATION-REFLECTING RECORD CARRIER WITH BEAM SPLITTING ELEMENT

[75] Inventor: Kornelis Bulthuis, Eindhoven, Netherlands

[73] Assignee: U.S. Philips Corporation, New York, N.Y.

[22] Filed: Feb. 11, 1975

[21] Appl. No.: 548,998

[30] Foreign Application Priority Data
Nov. 29, 1974 Netherlands.................. 7415574

[52] U.S. Cl. .................. 178/6.6 R; 179/100.3 V; 178/6.7 A; 250/566; 178/6.6 DD
[51] Int. Cl.$^2$.................. H04N 5/76; G11B 11/00
[58] Field of Search ............ 179/100.3 V, 100.41 L; 178/6.7 R, 6.7 A, 6.6 R, 6.6 DD; 250/566, 570

[56] References Cited
UNITED STATES PATENTS 3,876,842  4/1975  Bouwhuis.................. 179/100.3 V
3,919,698  11/1975  Bricot.................. 250/566

OTHER PUBLICATIONS

"The Philips 'VLP' System"; by K. Compaan and P. Kramer; Philips Tech. Rev. 33, No. 7, Oct., 1973, pp. 178-180.
"An Experimental Optical Videodisc Playback System", by G. W. Hrbek, July, 1974, Journal of the SMPTE, vol. 83.

Primary Examiner—Vincent P. Canney
Assistant Examiner—Alan Faber
Attorney, Agent, or Firm—Frank R. Trifari; Simon L. Cohen

[57] ABSTRACT

An apparatus is described for reading a radiation-reflecting record carrier on which information is stored in an optically readable structure. For separating the modulated and the unmodulated read beam, the radiation path from the radiation source to the record carrier includes a beam-splitting element with such a reflection coefficient that only a small part of the modulated read beam returns to the radiation source, while a sufficiently large part of said beam reaches a radiation-sensitive detector.

8 Claims, 3 Drawing Figures

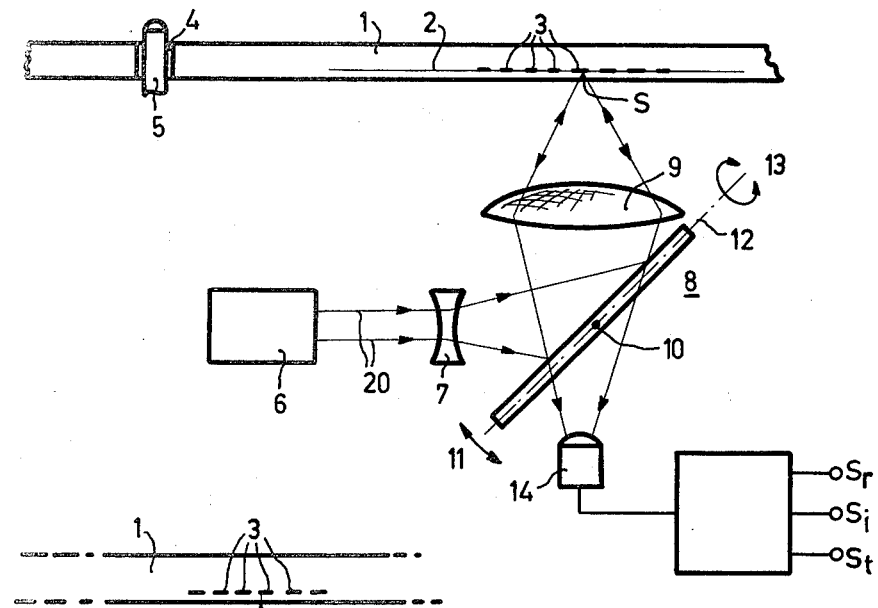
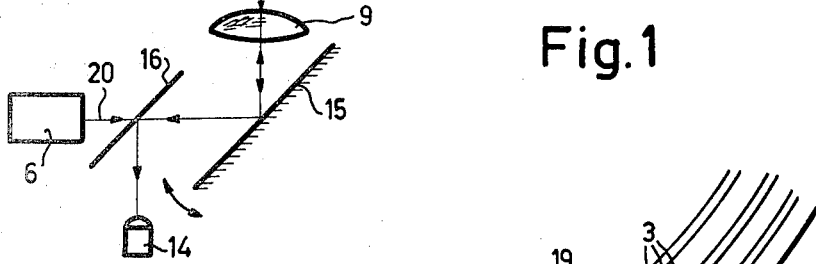
Fig.1
Fig.2
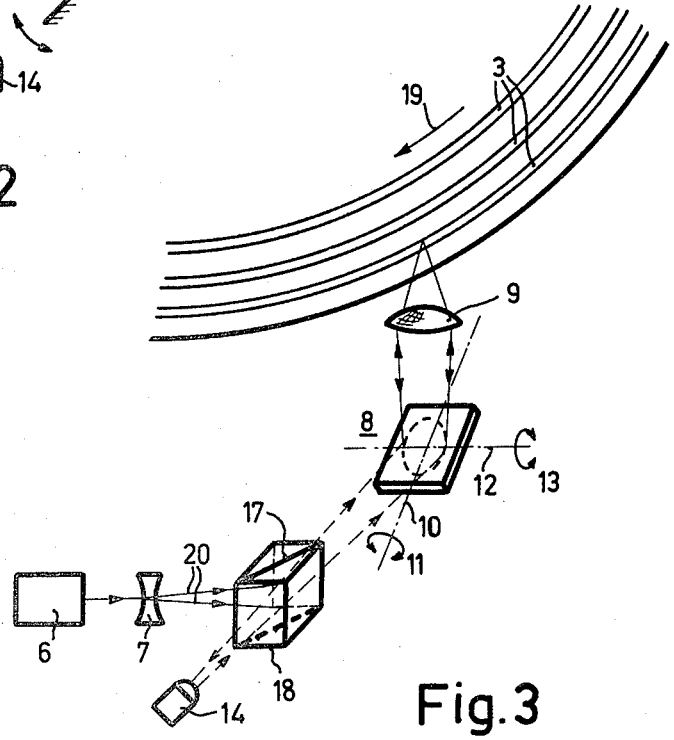
Fig.3

APPARATUS FOR OPTICALLY READING A RADIATION-REFLECTING RECORD CARRIER WITH BEAM SPLITTING ELEMENT

The invention relates to an apparatus for reading a radiation-reflecting record carrier on which information is stored in an optically readable track-shaped structure, which apparatus comprises a radiation source which supplies a read beam, an objective system for focussing the read beam on the plane of the information structure, and a radiation-sensitive detector for converting the read beam which is modulated by the information structure into an electric signal.

It has been proposed previously, for example in "Philips' Technical Review" 33, No. 7, pages 186–189, to employ such an apparatus for reading a flat disc-shaped record carrier on which a color television signal is recorded. In that case a reflecting record carrier was opted for, because the modulated read beam then partly traverses the same path as the unmodulated read beam. Some of the optical elements required for imaging are then traversed both by the entrant and the returning read beam. As a result, the total number of optical elements and also the effect of possible vibrations of the optical elements can be smaller than when a radiation-transmitting record carrier is read.

After the modulated read beam has traversed the common elements it must be directed towards the radiation-sensitive detector. For this, a semi-transparent mirror might be disposed in the radiation path, so that apart from losses in the optical path, 25% of the radiation which is emitted by the source would reach the detector. However, half of the radiation which is reflected by the record carrier will then be returned to the radiation source via the mirror. Such a feedback of modulated radiation to the radiation source is highly undesirable if said source is a gas laser.

In order to prevent said feedback steps may be taken, as is described in the cited article, to ensure that the radiation beam which emerges from the laser is linearly polarized and a polarization sensitive dividing mirror may be included in the radiation path, which transmits the radiation emitted by the laser. Furthermore, a λ4-plate in diagonal position is disposed between said dividing mirror and the record carrier. Said λ/4-plate is traversed twice by the read beam, so that the direction of polarization of the modulated read beam is rotated through 90° relative to that of the read beam emitted by the laser. The modulated read beam is then fully reflected to the detector by the polarization-sensitive dividing mirror, thus preventing feedback of the modulated read beam to the laser.

The known apparatus furthermore comprises a tilting mirror between the dividing mirror and the objective system, which tilting mirror enables a fine control of the centering of the read spot formed on the plane of the information structure by the objective system relative to a track to be read.

In practice the known read apparatus performs satisfactorily, but comprises a comparatively high number of optical elements, of which in particular the polarizing elements are expensive. The object of the present invention is to provide a read apparatus which comprises no polarizing elements for separating the beam and a minimum number of other optical elements, yet enabling satisfactory reading. The apparatus according to the invention is characterized in that the radiation path after the radiation source includes a beam divider which reflects a part of the radiation which is emitted by the radiation source to the record carrier and which transmits a part of the radiation which is reflected by the record carrier to the radiation-sensitive detector, or which transmits a part of the radiation which is emitted by the radiation source to the record carrier and reflects a part of the radiation which is reflected by the record carrier to the radiation-sensitive detector, and which beams divider has a reflection coefficient which is approximately 0.3 and 0.7 respectively.

The invention is based on the insight that when the reflection coefficient of the dividing mirror is suitably selected only a small part of the radiation which is reflected by the record carrier will reach the radiation source, while yet a sufficiently high radiation intensity will reach the detector.

A special embodiment of an apparatus according to the invention in which the beam divider is a dividing mirror is further characterized in that the dividing mirror is rotatable about at least one of two mutually perpendicular axes whose projections in the plane of the information structure are in the track direction and transverse to the track direction. In said last-mentioned apparatus the two functions: the separation of the unmodulated and the modulated read beam and fine control of the position of the read spot relative to the information structure in the lateral direction and, as the case may be, in the longitudinal direction of the tracks, are performed by one rotatable dividing mirror.

BRIEF DESCRIPTION OF THE DRAWINGS

FIG. 1 illustrates a first embodiment of the invention.

FIG. 2 illustrates a second embodiment of the invention.

FIG. 3 illustrates a third embodiment of the invention.

The invention will now be described with reference to the drawing in which three embodiments of an apparatus according to the invention are shown in FIGS. 1, 2 and 3. In said Figures corresponding elements are denoted by the same reference numerals.

In FIG. 1 a record carrier 1, which by way of example is assumed to be disc-shaped and round, is shown in radial cross-section. In said record carrier the information may be contained in a spiral track which consists of a multitude of quasi-concentric sub-tracks 3, which each extend over one revolution across the record carrier. Each sub-track may comprise a multitude of areas which alternate with intermediate areas, while the information may be contained in the lengths of the areas and the intermediate areas. The areas have a different effect on a read beam than the intermediate areas. The method in which the information can be recorded in the tracks is immaterial for the present invention, and will therefore not be discussed. The plane 2 of the sub-tracks may be located at the surface of the record carrier. However, it is alternatively possible, as is shown in FIG. 1, that a protective coating is provided on the information structure. The sort of information which is recorded is of no significance for the present invention; the information may be a (color) television program, an audio program or other information.

The record carrier is read with a read beam 20 which is supplied by a laser source 6. The path of the read beam includes a dividing mirror 8, which reflects a part of the radiation to the record carrier. After reflection at the mirror 8 the read beam passes through an objective system 9, which is schematically represented by a single lens, which focusses the beam to a small read spot S of the order of magnitude of the information areas on the record carrier. The field lens 7 ensures that the read beam fills the entire entrance pupil of the objective system.

Said field lens could be a converging lens. However, by using a diverging lens as shown in FIG. 1, the distance between the laser source 6 and the objective system, and thus the total radiation path, can be shorter than in the case of a converging lens. According to a further feature of the invention, the last mirror of the laser, which is not shown in detail, may be such that a diverging beam emerges from said laser. The field lens 7 may then be dispensed with and the radiation path can be still shorter.

The information structure reflects the read beam, which then traverses the objective system for a second time. When the record carrier rotates about a spindle 5 which extends through an opening 4 in the record carrier, the read beam is time modulated in accordance with the sequence of the areas and the intermediate areas of a track to be read.

Subsequently, the modulated read beam is again incident on the semi-dividing mirror 8. The read beam is then partially transmitted to a radiation sensitive detector 14. At the output of said detector a signal is obtained which is time modulated in accordance with the sequence of areas and intermediate areas in a track to be read. Said signal may be processed in known manner in an electronic device 15 into a signal $S_i$, which is suitable for application to a conventional apparatus for rendering the information which is recorded on the record carrier visible or audible.

According to the invention the mirror 8 has a reflection coefficient R of approx. 0.3. The amount of radiation which is transmitted to the detector 14 is proportional to $R.(1-R)$; while the amount of radiation which returns to the source 7 is proportional to $R^2$. For a reflection coefficient R of 0.3, apart from any losses in the radiation path and irrespective of the modulation by the record carrier, approx. 21% of the radiation which is emitted by the source will reach the detector, while only 9% of the laser radiation returns to the source. If the reflection coefficient were 0.5, i.e. which is an optimum for the detector signal, 25% of the radiation emitted by the source would reach the detector, while another 25% would return to the source which is impermissibly high. Thus, by selecting a reflection coefficient of 0.3 the amount of radiation at the detector is not substantially reduced, while the amount of radiation which returns to the source is appreciably reduced compared with the situation with a reflection coefficient of 0.5. The advantage is that no polarizing means are required, while furthermore the read apparatus comprises a small number of optical elements.

During reading of a record carrier care must be taken that the read spot S remains centered on a track to be read. For correcting the position of the read spot in the lateral direction of the tracks, according to the invention, the semi-transparent mirror 8 can be disposed rotatably, so that no additional optical element is required for said function. The axis of rotation 10 of said mirror 8 is parallel to the track direction and thus normal to the plane of drawing in FIG. 1, so that the mirror can move in the direction indicated by the arrow 11.

Errors in the centering of the read spot relative to a track to be read can be detected without the use of additional optical elements in the read apparatus. For this, as is described in the previous U.S. Pat. application Ser. No. 442,396, filed Feb. 14, 1974, use can be made of a record carrier whose tracks undulate in the plane of the information structure. The undulation period is then substantially greater than the average spatial period of the areas in the tracks, while the amplitude of the undulation is smaller than the period of the tracks structure in the lateral direction of the tracks. The undulation of the tracks impresses an additional modulation on the detector signal, the phase of said modulation being a measure of the centering of the read spot relative to a track to be read. From the detector signal a low-frequency component can be derived, which component can be processed to a control signal $S_r$. Said control signal $S_r$ is applied to a control mechanism for rotating the mirror 8 in the direction 11, which mechanism is not shown and is known per se.

When reading a round disc-shaped record carrier, it may furthermore be necessary to correct the tangential position of the read spot, i.e. the position viewed in the track direction. Owing to for example out-of-roundness of the record carrier or a eccentricity of the pivot, it may happen that a track no longer extends concentrically or spirally relative to the pivot, which may give rise to time base errors in a television signal which is read. Said errors can be compensated by correcting the tangential position of the read spot. For this, according to the invention, the mirror 8 may be disposed rotatably (see the arrow 13 in the Figure) about an axis 12.

From the low-frequency component of the detector signal, which component provides an indication about the centering of the read spot relative to a track to be read, a signal $S_t$ may be derived which provides an indication about the tangential position of the read spot, by means of a phase-shifting element, in a manner as described in U.S. application Ser. No. 410,774, filed Oct. 29, 1973, now U.S. Pat. No. 3,876,827, issued Apr. 8, 1975. Said element causes a phase shift of ¼ part of the revolution period of the record carrier. As a result, no additional optical elements are required for correction of the tangential position of the read spot.

In the apparatus of FIG. 1 the rotatable mirror 8 must be located nearest to the entrance pupil of the objective system, in order to prevent the read beam from being deflected too far beyond the pupil when said mirror is rotated.

The mirror 8 in the apparatus of FIG. 1 must be rotatable about two axes. The drive means for performing the movements of the mirror then must not be disposed in the radiation path. The construction of such a rotatable mirror with its driving elements is rather intricate. Said drive means can be substantially simplified when a separate dividing mirror and a separate rotatable mirror are used. In FIGS. 2 and 3 two embodiments are shown of a read apparatus with a dividing mirror and a rotatable mirror 15. Said Figures only show a part of the apparatus of FIG. 1.

In the embodiment of FIG. 2 a part of the radiation which is emitted by the laser source is transmitted by the dividing mirror 16 to a fully reflecting mirror 15. Said miror 15 is rotatable about two axes in a similar manner as the mirror 8 in FIG. 1. After reflection at the mirror 15 the read beam 20, which for simplicity is represented by its chief ray 20 only, is focussed on a track 3 by the objective system 9. The read beam which is modulated by the record carrier traverses the objective system 9 for a second time and is then reflected to the dividing mirror 16 by the mirror 15. Said mirror 16 reflects the modulated read beam partially to the radiation sensitive detector 14. In the arrangement of FIG. 2 the amount of radiation which is reflected to the detector is proportional to R.(1-R), while the amount of radiation which returns to the source is proportional to $(1-R)^2$. For a reflection coefficient R = 0.7 approx. 21% of the radiation which is emitted by the source arrives at the detector, while only 9% of the laser radiation returns to the source.

FIG. 3 is a perspective view of a third embodiment of an apparatus according to the invention. On the record carrier 1 the information tracks 3 are now visible. The arrow 19 indicates in which direction the tracks are read. The read beam 20 which is emitted by the laser source 6 and passes through the diverging lens 7 is partly reflected at the face 17 of a beam splitting element, which takes the form of a dividing prism 18, to the mirror 8 which is rotatale about two axes (10 and 12). The fully reflecting mirror 8 directs the read beam at the record carrier. After reflection at the plane of the information structure, the read beam reaches the dividing prism 18 via the rotatable mirror 8. The modulated read beam is then partially transmitted to the detector 14. Like in the apparatus of FIG. 1, a substantial reduction of the radiation which returns to the source can be obtained, the amount of radiation to the detector not being substantially affected if the face 17 has a reflection coefficient of 0.3. In the apparatus of FIG. 3 the radiation path is partially disposed in the radial direction and partially in the tangential direction of the information structure, so that the dimension in the radial direction of the read apparatus can be smaller than that of the embodiment of FIG. 2. In order to prevent radiation which might be reflected by the sides of the dividing prism (the upright sides in FIG. 3) from returning to the source, said sides may be inclined, i.e. make an angle which differs from 90° with the chief ray of the read beam.

What is claimed is:

1. An apparatus for reading a radiation-reflecting record carrier on which information is stored in the form of an optical structure in tracks, comprising a radiation-sensitive detector, a radiation source means for providing a read beam of radiation, a reflective beam divider having a reflection coefficient of approximately 0.3 in the path of the read beam for reflecting the beam toward the record carrier, an objective system in the path of the beam between the beam divider and the record carrier for focussing the beam on the information structure and for directing the beam reflected from the record carrier through said beam divider to said radiation-sensitive detector.

2. An apparatus as claimed in claim 1, wherein the beam divider is a beam splitting mirror, wherein the beam splitting mirror is rotatable about at least one of two mutually perpendicular axes whose projections in the plane of the information structure are disposed in the track direction and transverse to the track direction.

3. An apparatus as claimed in claim 1, wherein the radiation source means comprises means for providing a diverging beam of radiation which fills the pupil of the objective system completely.

4. An apparatus as claimed in claim 1, wherein the beam-splitting element is disposed so that it partially reflects the radiation which is emitted in a first direction by the laser source into a second direction towards a rotatably disposed fully reflecting mirror, which mirror reflects the read beam to the record carrier, the first and the second direction being parallel to the plane of the record carrier.

5. An apparatus for reading a radiation-reflecting record carrier on which information is stored in the form of an optical structure in tracks comprising a radiation-sensitive detector, read source means for providing a read beam of radiation, a reflective beam divider having a reflection coefficient of approximately 0.7 in the path of the read beam for transmitting the beam to the record carrier, an objective system in the path of the beam between the beam divider and the record carrier for focussing the beam from the beam splitter onto the record carrier and for directing the beam reflected from the record carrier to said beam divider, said beam divider reflecting part of the beam reflected from the record carrier to said radiation-sensitive detector.

6. An apparatus as claimed in claim 3, wherein the radiation source means comprises a laser provided with a diverging element on an end mirror thereof.

7. An apparatus as claimed in claim 5, wherein the radiation source means comprises means for providing a diverging beam of radiation which fills the pupil of the objective system completely.

8. An apparatus as claimed in claim 7, wherein the radiation source means comprises a laser provided with a diverging element on an end mirror thereof.

* * * * *